United States Patent Office 3,210,038
Patented Oct. 5, 1965

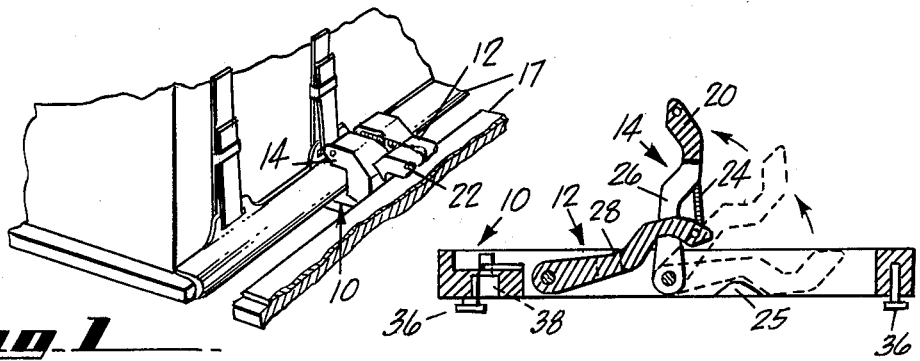
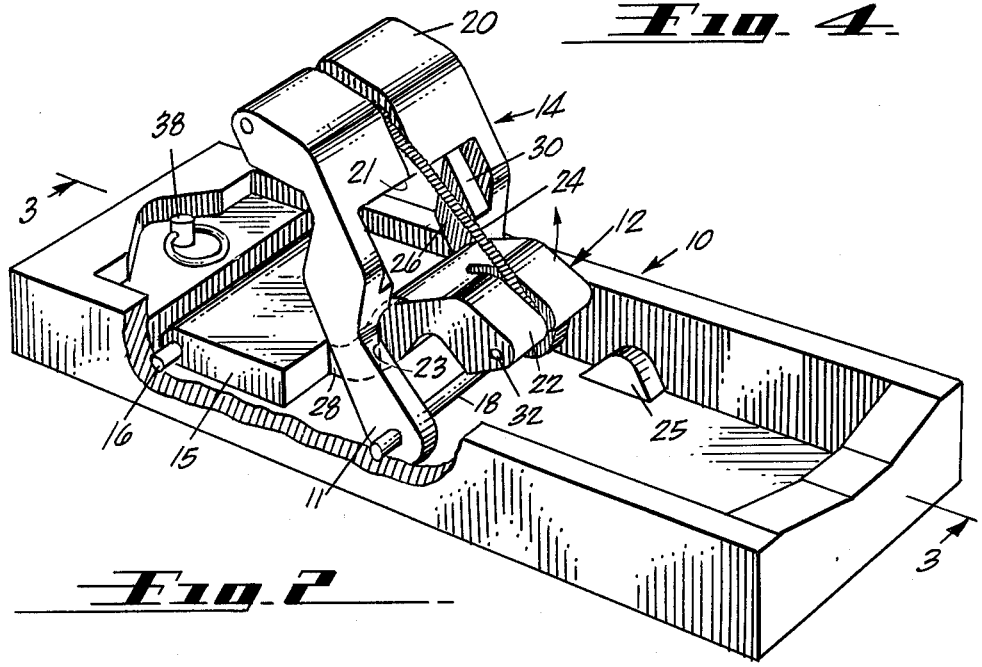
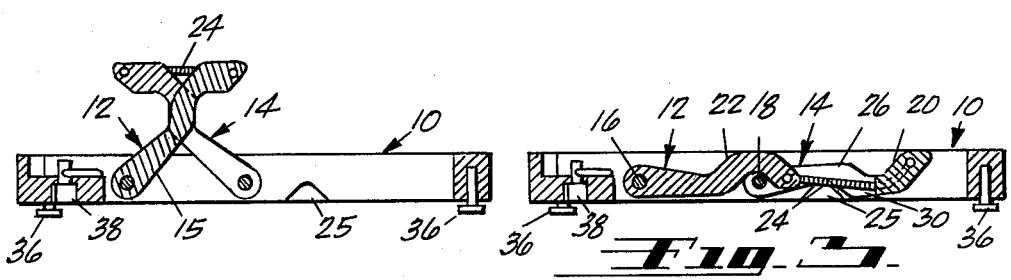
INVENTORS
HOWARD E. BADER
ROBERT A. WARREN
BY Leon D. Rosen
— ATTORNEY —

3,210,038
CARGO LATCH
Howard E. Bader and Robert A. Warren, Long Beach, Calif., assignors to Douglas Aircraft Company, Inc., Santa Monica, Calif.
Filed Sept. 26, 1963, Ser. No. 311,692
9 Claims. (Cl. 248—361)

This invention relates to latches and more particularly to those latches which are useful for holding cargo pallets and the like.

Pallets for holding cargo typically comprise wooden platforms to which are fastened metal edge molding, the molding serving to protect the edges of the platforms and as anchor points for belts or ropes used to tie down cargo. The pallets are often loaded into airplanes or other cargo storage areas and secured in place by means of latches which engage the edges of the pallets and prevent shifting. Generally, such latches are removable devices which must be fastened to the floor of the airplane after pallets are loaded and which must be removed in order to permit the unloading of the pallets. The inconvenience involved in attaching and removing such latches and the possibility of their being misplaced makes it desirable to provide a latch which may be retained in place during pallet loading and unloading. Such a latch must be foldable or otherwise positionable so as to allow for the removal of pallets, and is preferably constructed so that it can be set up or erected quickly and easily to secure pallets once they have been positioned in the cargo storage area. Furthermore each latch should be capable of holding pallets on either side thereof when positioned between two pallets, and of holding each pallet not only against lateral shifting but also against upward movement which might otherwise result from forces encountered during flight. Such a cargo latch is provided by the present invention.

Prior latches used to secure pallets have generally been removable devices which had to be installed after each pallet was loaded and before it was removed. This involved the use of loose pieces of hardware which could easily be lost and entailed the expending of time and effort to securely fasten each latch to brackets provided therefor in the airplane. Proposals for erectable latches have involved complicated mechanisms with at least three basic parts, which could not be erected without substantial agility and skill, or which easily jammed. The present invention provides a latch which has only 2 basic moving parts, which is easily erected and retracted without the use of skill or agility, and which is foolproof and unlikely to jam.

The pallet latch assembly of the present invention is generally attached to the floor of an aircraft or other cargo storage structure. The assembly is adapted for placement in an unlatched or retracted state wherein it has a very low profile which allows for the passage thereabove of cargo pallets upon rollers, rails or the like. Upon placement of the latch assembly in a latched or erected position, however, it is raised sufficiently high to interfere with and restrain cargo pallets.

The latch is basically an interlocking double pawl assembly. In several embodiments of the invention, the unpivoted ends of the pawls are tied together by a spring so that when one pawl is lifted the other also springs up. The pawls are also provided with interlocking projections which lock the assembly in its upward or erect position. The latch assembly is generally so constructed that it may be erected merely by pulling up on one pawl, and may be retracted by pushing down on the other pawl.

Accordingly, one object of the present invention is to provide a latch assembly which is simple, reliable, and easily erected and retracted.

Another object of the invention is to provide a latch assembly which may be retracted so that it has a very low profile and does not interfere with pallets moving thereabove.

Still another object of the invention is to provide a latch assembly which may be easily erected and which automatically locks into its erect position.

A still further object of the invention is to provide a foldable latch assembly which is easily erected and which serves to hold cargo bearing pallets against both lateral and upward forces.

Still further among the objects of the invention is to provide a pallet restraining latch having only two moving parts, the two parts so arranged that they lock into one another and serve to hold pallets.

These and other objects of the invention and a more complete understanding thereof may be had by reference to the following description and claims taken in conjunction with the accompanying drawings in which:

FIGURE 1 is a partial pictorial view showing the position and environment of the latch assembly in a typical use.

FIG. 2 is a partially sectional pictorial view of the latch assembly in a position between a fully erect and fully retracted state.

FIG. 3 is a sectional side view showing the latch assembly in a fully retracted or downward position.

FIG. 4 is a sectional view illustrating the movement of the latch assembly from its fully retracted to its fully erect position.

FIG. 5 is a sectional view showing the latch assembly in its upward or fully erect position.

Figure 7:
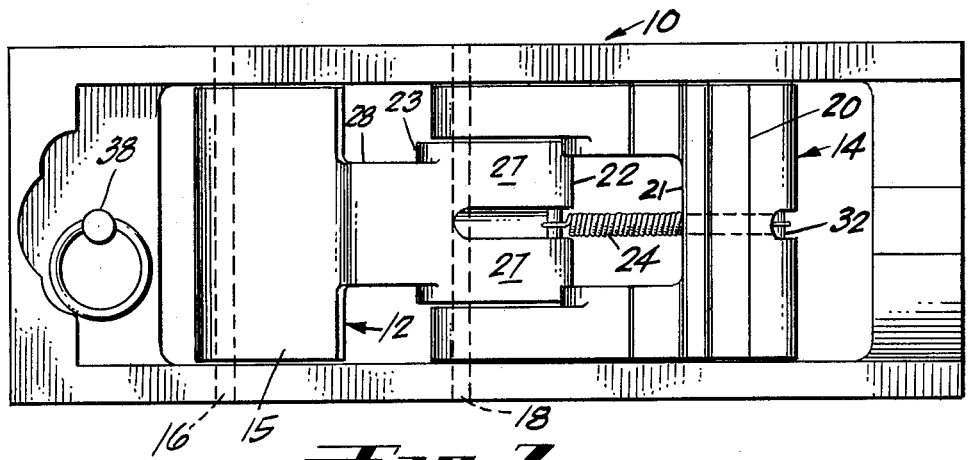
FIG. 7 is a top elevation view of the latch assembly of FIG. 1.
Figure 6:
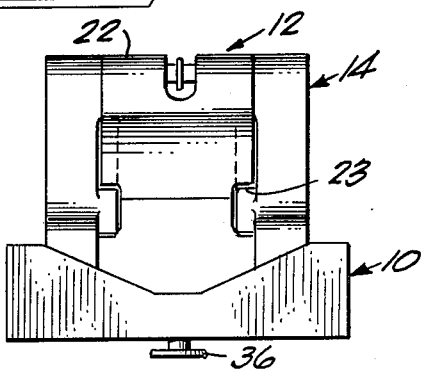
FIG. 6 is an end elevation view of the latch assembly of FIG. 1.

With reference to the drawings wherein like numerals refer to like references, one embodiment of the invention comprises a frame 10 on which is mounted an outer pawl 14 and an inner pawl 12. The outer pawl 14 is a U-shaped member having legs 11 whose ends are held to the frame 10 by a shaft 18 to enable the pivoting of the pawl. The base 20 of the U-shaped pawl is formed into a hook shape to enable the engaging of the lip 17 of a cargo pallet. Between the pivot point of the legs 11 and the base or hooked end 20 are inner protuberances 26 for blocking rotation of the inner pawl 12.

In describing the device herein, the following definitions are employed. A radial dimension or direction referred to in connection with a pawl or a part thereof is defined as a dimension or direction taken along a line radiating from the axis about which that pawl rotates, and a transverse dimension or direction is defined as one parallel to the axis of rotation.

The inner pawl 12 has one radially inner end 15 which engages a shaft 16 for pivotal mounting to the frame 10, and has an opposite hook-shaped end 22 for engaging the lip 17 of a cargo pallet. The hooked end 22 of the inner pawl 12 has a sufficiently narrow transverse dimension that it can pass within the U-shaped opening of the outer pawl 14. A middle portion 28 between the hooked end 22 and the inner end 15 is recessed or slotted to enable the inner pawl 12 to disengage from and rotate past the protuberances 26. The recess 28 has a radial dimension which is greater than the thickness of the protuberances 26 so that the protuberances pass within the recess or slot 28 and do not block the rotation of the inner pawl 12. The radially inner end 15 has a transverse dimension which is sufficient to block the legs 11 of the outer pawl when the two pawls are raised to the erect position, thus preventing excessive rotation of the outer pawl 14. The bottom or limiting surface 21 of the hooked end 20 of the outer pawl serves to abut an abutting surface 27 of the hooked end 22 of the inner pawl 12 and limit its rotation. Locking surfaces 30 on the outer pawl 14, which extend radially or substantially perpendicular to the limiting surface 21, and locking surfaces 23 at the radially outer end of the recesses 28 enable the locking together of the pawls to assure their remaining erect.

The hooked ends 20 and 22 of the pawls are joined together by a spring 24. This spring allows for the raising and lowering, or erecting and retracting of the cargo latch assembly by the application of force to only one pawl of the pair.

FIG. 3 shows the latch assembly in a down or retracted position. It can be seen that when the assembly is retracted both pawls 12 and 14 lie almost flat with the frame 10 and provide a very low profile. In order to keep the pawls from rotating to too low a position wherein they would be difficult to grasp, a stop 25 is provided on the frame 10 to limit the downward rotation of the outer pawl 14. The inner pawl 12 is prevented from moving downward by the shaft 18 which it abuts when it moves to the downward or retracted state. It can be seen that the shaft 18 and the hooked end 22 of the inner pawl 12 are so positioned that the hook fits around the shaft 18 when the latch assembly is retracted, thereby allowing the pawl 12 to lie in a low or very horizontal position.

The latch assembly is raised or erected by pulling upward on the hooked end 20 of the outer pawl 14. The upward force rotates the pawl 14 and in so doing causes spring 24 to exert an upward force on the inner pawl 12. The inner pawl cannot move very far upward because the hooked end 22 abuts protuberances 26 positioned on the inside of the legs 11 of the outer pawl.

The recesses 28 in the pawl 12 are provided to allow the inner pawl 12 to move past the protuberances 26 when the outer pawl 14 is rotated to almost its position of the erect state. When the outer pawl is so rotated the protuberances 26 engage the recesses 28 of the inner pawl 12 and the inner pawl is allowed to rotate upward. The spring 24 pulls the inner pawl 12 upward until the hooked end 22 abuts the limiting surface 21 of the outer pawl. The latch assembly is now in an upward or fully erect position.

The latch assembly is maintained erected by tension forces on the spring 24 which keep the pawls together. If lateral force is applied to the outer pawl 14 to tend to rotate it downward to a retracted position, the inner latch 12 prevents such rotation by virtue of the engagement of the locking surfaces 23 with the locking surfaces 30 of the protuberances 26. Thus, lateral forces exerted by a cargo pallet merely lock the outer pawl 14 against the hooked end 22 of the inner pawl and the outer pawl 14 does not move. Similarly upward forces on the hooked end 20 of the outer pawl cannot rotate the pawl 14 around to its retracted state because of the engagement of the locking surface 30 with the locking surface 23 of the inner pawl.

The inner pawl 12 securely holds cargo pallets by virtue of the abutting of the hooked end 22 of the inner pawl with the hooked end 20 of the outer pawl. Lateral or upward forces on the hooked end 22 of the inner pawl, such as those forces exerted by cargo pallets held by the inner pawl, are transmitted by the abutting surface 27 of the hooked end 22 to the limiting surface 21 of the outer pawl and the pawl 12 resists movement. Thus the inner pawl 12 securely holds cargo pallets against lateral and upward movement.

The only way in which the latch assembly can be moved downward or retracted is by first rotating the inner pawl 12 downwardly so that the locking surface 23 disengages from the locking surface 30 of the protuberance 26. Such downward force on the inner pawl 12 is easily exerted by an operator who desires to move the latch to its unlatched or retracted state, but such force is not exerted by a cargo pallet which is being held by the latch and the latch does not retract accidentally. When a cargo pallet is engaged by the latch, the latch cannot be moved downwardly or retracted because the hooked end 22 abuts the edge of the pallet being held. In order to retract the latch assembly any cargo pallet held by the inner pawl 12 must be removed from it. After the pallet engaged by the inner pawl 12 is removed, both pawls can be retracted without moving the pallet held by the outer pawl 14. When the inner pawl 12 is moved downwardly it stretches the spring 24. The spring holder 32 of the inner pawl 12 is on a side of the shaft 18 which enables the force of the stretched spring to rotate the outer pawl 14 around toward a downward or retracted state. That is, the forces exerted by the spring 24 on the outer latch 14 result in a torque which tends to rotate the outer latch toward the stop 25. If the spring tension does not move the outer latch to the completely retracted position, gravity will do so once the outer latch rotates past a vertical position.

The latch assembly is adapted for permanent installation in a well or recessed track in a cargo storage area so that when the latch is retracted and displays a low profile, no part of the frame 10 or pawls 12 and 14 protrude above the floor of the storage area. When a pallet is being held by the latch assembly, the frame 10 lies beneath the lip 17 of the pallet. Although the assembly may be permanently installed, provisions are made in the particular embodiment shown to readily enable its attachment and removal from the floor of a storage area. For this reason, studs 36 are provided at either end of the frame 10 to allow for the engagement of the latch assembly in a standard mounting track provided in many cargo airplanes and other storage enclosures. A spring biased plunger 38 is slidably mounted above the lip of a stud 36 to press thereon and hold the latch assembly to the mounting track.

Although a latch assembly is shown wherein an inner and outer pawl are provided which move within or through openings or cut away portions provided in each other, such an arrangement is described only by way of example and as one embodiment of the invention. One variation of the described assembly is obtained by constructing pawls which appear as though they were obtained by cutting the described pawls through their middle or center lines as defined by the spring 24 or the line 3—3 in FIG. 2. Such a latch assembly would then operate in the same way, even though there would be only one protrusion 26, one recess 28, one-half the bearing area between the limiting surface 21 and the hooked end 22, and so forth.

Although a particular embodiment of the present invention has been shown and described herein, many other modifications will be apparent to those skilled in the art, including modifications in the choice of parts included in the assembly and in the particular shapes and arrangements thereof. It is therefore desired to emphasize the fact that many variations may be resorted to in a manner limited only by a just interpretation of the following claims:

We claim:
1. A latch comprising:
    a frame means;
    a first pawl pivotally mounted on said frame means for erection and retraction and wherein, in said position of erection said first pawl is oriented more than 90° from its position of retraction;
    said first pawl having a locking surface extending in a direction substantially radial of its point of pivotal mounting on said frame means;
    said first pawl having a limiting surface substantially perpendicular to said locking surface; and
    a second pawl pivotally mounted on said frame means, said second pawl rotatable in said first direction for erection and rotatable in said second direction for retraction;

said second pawl having a locking surface disposed for contact with said locking surface of said first pawl when said first and second pawls are erected;

said second pawl having an abutting surface extending substantially perpendicular to said locking surface of said second pawl and disposed for contact with said limiting surface of said first pawl when said first and second pawls are erected, whereby in the erection of said latch, said first pawl moves down onto a member to be held by said latch.

2. A latch as defined in claim 1 including:

stretchable spring means connected between portions of said pawls which are spaced from their points of pivotal mounting to said frame, whereby to bias said portions of said pawls together and cause the erection of both pawls when only one is forced toward an erect position.

3. A latch adapted for use in connection with movable elements normally disposed on opposite sides of said latch, said latch comprising:

a frame structure, said frame structure located whereby said movable elements may be disposed adjacent thereto;

a pair of latching pawls pivotally carried by said frame structure and positioned for pivotal interengagement with each other, said pawls being movable between an erected position wherein said pair of pawls are oriented for engaging said movable elements and a retracted position thereof relative to said frame structure;

spring means coupled to the free ends of said pawls for biasing said free ends toward each other; and abutment means carried by each of said pawls and adapted for engagement with each other upon erection of said pawls, said spring means maintaining said engagement and said erection, said pawls being thus engageable with said elements to retain said elements against movement in a direction toward said frame structure.

4. A cargo pallet latch comprising:

a frame;

a first pawl having an axle end portion and an engaging end portion, said axle end portion pivotally mounted on said frame for rotation to and from a latched position;

a second pawl having an axle end portion and an engaging end portion, said axle end portion of said second pawl pivotally mounted on said frame a spaced distance from said axle end of said first pawl for enabling rotation to and from a latched position;

spring means for biasing said pawls together, mounted between said first and second pawls;

a protuberance on said first pawl for blocking the initial movement of said second pawl toward a latched position;

a recess in said second pawl for enabling disengagement with and movement past said protuberance when said first pawl is sufficiently rotated toward a latched position;

a limiting surface on said first pawl for engaging with and limiting the total rotation of said second pawl in a direction toward latching;

a locking surface on said second pawl extending substantially perpendicular to said recess; and a locking surface on said first pawl extending substantially transverse to said limiting surface for engagement with said locking surface on said second pawl.

5. A cargo pallet latch as defined in claim 4 wherein said first pawl is substantially U-shaped, the engaging end portion thereof forming the base of the U, and said second pawl is movable between the legs of said U-shaped first pawl.

6. A cargo pallet latch as defined in claim 4 wherein said spring means is a coil spring whose ends are attached to the engaging end portions of said first and second pawls.

7. A cargo pallet latch as defined in claim 4 including a stop mounted on said frame a spaced distance from the pivot axis of said first pawl for blocking the rotation of said first pawl in a direction away from a latched position.

8. A cargo pallet latch comprising:

a frame having a pair of opposite sides;

an inner pawl having a radially inner end pivotally mounted between said opposite sides of said frame, said inner end having a transverse dimension slightly less than the distance between said opposite sides; a radially middle portion of said inner pawl having a transverse dimension substantially less than that of said inner end; a radially outward portion of said inner pawl having a transverse dimension between that of said middle portion and of said lower portion; and a U-shaped outer pawl, the end portions of the legs thereof pivotally mounted between said opposite sides of said frame, the distance between at least part of said leg end portions being slightly greater than the transverse dimensions of said radially outward portion of said inner pawl; the distance between said legs at locations situated along a center portion located between said end portions and the base of said U-shaped pawl being slightly greater than the transverse dimension of said middle portion of said inner pawl; and the thickness of said legs along said center portion being less than the length of radial extension of said middle portion of said inner pawl; the distance between the points of pivotal mounting of said inner and outer pawls to said frame being sufficient for enabling passage of said outward portion of said inner pawl between the legs of said outer pawl.

9. A cargo pallet as defined in claim 8 including a tension spring means fastened to said radially outward portion of said inner pawl and to the base of said U-shaped outer pawl.

References Cited by the Examiner

UNITED STATES PATENTS 2,577,330   12/51   Johnston _____ 248—361 X
3,125,035   3/64    Loomis _____ 248—361 X CLAUDE A. LE ROY, *Primary Examiner.*